United States Patent [19]
Kishi

[11] 3,842,928
[45] Oct. 22, 1974

[54] VEHICLE FOR A CHILD
[75] Inventor: Yoshihiro Kishi, Tokyo, Japan
[73] Assignee: Asahi Toy Company, Tokyo, Japan
[22] Filed: June 15, 1972
[21] Appl. No.: 263,284

[30] Foreign Application Priority Data
Aug. 21, 1971 Japan.............................. 46-75144
Aug. 23, 1971 Japan.............................. 46-76045

[52] U.S. Cl............................. 180/26 R, 180/65 R
[51] Int. Cl............................................ B62d 61/08
[58] Field of Search......... 180/26 R, 65 R; 200/157, 200/1 V, 11 G; 46/244 R

[56] References Cited
UNITED STATES PATENTS

| | | |
|---|---|---|
| 585,590 | 6/1897 | Pallen................................ 280/293 |
| 1,307,094 | 6/1919 | Gilbert................................ 200/1 V |
| 1,556,828 | 10/1925 | Wyman................................ 200/1 V |
| 3,416,625 | 12/1968 | Narutani....................... 180/26 R X |
| 3,570,620 | 3/1971 | Fisher et al. ...................... 180/26 R |
| 3,659,378 | 5/1972 | Tong................................ 46/244 R |

Primary Examiner—Allen N. Knowles
Assistant Examiner—John P. Shannon
Attorney, Agent, or Firm—Oblon, Fisher, Spivak, McClelland & Maier

[57] ABSTRACT

A battery actuated and motor-driven three-wheeled toy car for a child having a seat at the rear part of the vehicle and being driven by a front wheel associated with a gear reduction mechanism and a motor which is energized or de-energized by operation of a manually maneuverable lever.

5 Claims, 4 Drawing Figures

VEHICLE FOR A CHILD

BACKGROUND OF THE INVENTION

1. Field Of The Invention

This invention relates generally to a battery-actuated and motor-driven vehicle, and more particularly to a toy car for a child which can be driven in a playground or at home.

2. Description Of The Prior Art

Vehicles for children in the shape of automobiles, locomotoves and the like, which are driven by a battery-actuated motor are well known. Conventionally, in vehicles of this kind, the motor is subjected to a large load when it is started, since these toy vehicles usually have four wheels and are driven by the rear wheels of the vehicle. Consequently, a power source of high voltage and capacity is required to start the motor, and the entire weight of the vehicle is therefore increased. Also, such conventional vehicles have made use of an electric circuit to drive the vehicle, which is switched on and off by operation of a pedal, and thus, it is difficult for a child to control or drive the vehicle while relying upon the feeling of treading the pedal, so that it is liable to be erroneously operated by the child.

SUMMARY OF THE INVENTION

Accordingly, one object of the present invention is to provide a vehicle for a child which is actuated and driven for a relatively long period of time with a power source of low voltage, for example, dry batteries.

Another object of the present invention is to provide a vehicle for a child which is light in weight, easy for a child to handle, economical to manufacture, and simple in construction.

Still another object of the present invention is to provide a vehicle for children which is driven or stopped by the manual operation of a lever so that the condition of the electric circuit can be easily recognized, even by a child.

Briefly, the foregoing and other objects are attained in accordance with the present invention by a battery actuated and motor driven vehicle having a single front wheel and right and left rear wheels. The front wheel of the vehicle is associated with the motor through an arrangement of reduction gears which are driven when the motor is actuated. The motor is electrically connected to a set of batteries through a switch which is manually operated by a lever. Accessory wheels are disposed on both sides of the front drive wheel, so as to give the vehicle the appearance of being a four-wheeled vehicle. The front drive wheel, its driving mechanism and the accessory wheels are all assembled in a simple and compact unit to be easily mounted on the body of the vehicle.

BRIEF DESCRIPTION OF THE DRAWINGS

Various other objects, features and many of the attendant advantages of the present invention will be more fully appreciated as the same becomes better understood by reference to the following detailed description when considered in connection with the accompanying drawings, wherein.

DESCRIPTION OF THE PREFERRED EMBODIMENT

Figure 1:
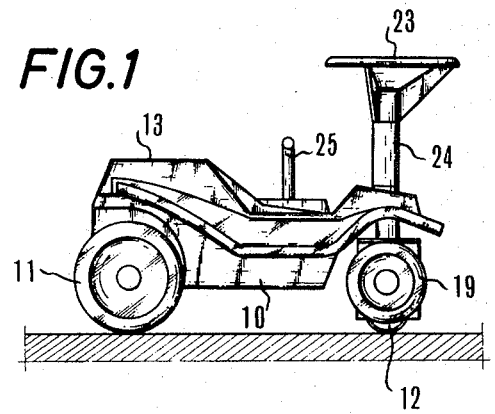
FIG. 1 is a side elevational view of a vehicle designed for use by a child in accordance with the present invention.
Figure 2:
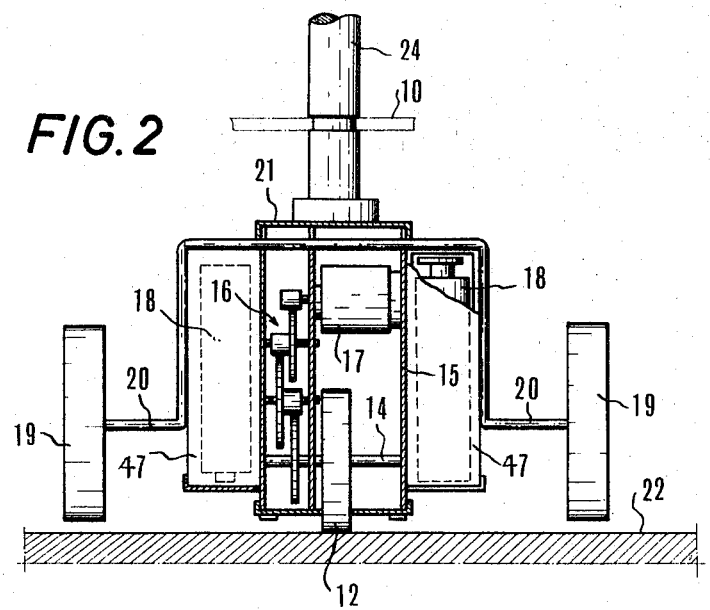
FIG. 2 is a front elevational view of a drive assembly for the vehicle showing the front drive wheel, the gear assemblies, the motor, and the accessory wheels.

Referring now to the drawings, wherein like reference numerals designate identical or corresponding parts throughout the several views, and more particularly to FIGS. 1 and 2 thereof, a vehicle of the instant invention is shown as including a body 10 which is supported by three wheels, namely, right and left rear wheels 11 and a front wheel 12, and a seat 13 is formed on the body above the rear wheels 11. The front wheel 12 is mounted on a drive shaft 14 which is pivotally supported in a housing 15 of driving assemblies which includes a gear reduction mechanism 16 and a motor 17. The drive shaft 14 is in mesh with the gear reduction mechanism 16 driven by the motor 15 so as to be able to drive and rotate the front wheel 12.

On both sides of the housing 15 there are provided chambers 47 for accomodating batteries 18 which may be replaceable or rechargeable when they are exhausted. In one embodiment of the present invention, four dry batteries, each of which is 1.5v, are used. Also, accessory wheels 19 are mounted on both sides of the front wheel 12 in such a manner that the axle 20 of the accessory wheels 19 bends at a right angle so as to cover the battery chambers 47 and the housing 15, and the axle 20 is fixed to the upper surface of the housing by a retaining member 21. The accessory wheels 19 can be raised or lowered to maintain a certain distance between the accessory wheels 19 and the surface of the ground 22, or to contact the surface of the ground 22 by adjusting the position of the axle on the surface of the housing 15. As is apparent from FIG. 2, according to one embodiment of the present invention, the accessory wheels 19 are mounted on the vehicle so that they may not be in contact with a surface of ground 22 or a floor so as to reduce frictional resistance and to make operation of the vehicle easy for a child when it is driven.

However, it should be understood that the accessory wheels 19 may be mounted on the axle 20 so as to be able to rotate freely and they may be placed in contact with the surface of the ground 22 or a floor if desired. On the other hand, the accessory wheels 19 may be entirely eliminated in some cases.

The front wheel 12, the reduction gears 16, the motor 17, the batteries 18, and the accessory wheels 19 are assembled in a compact unit, and they are disposed in the front of the vehicle. This assembly is rotatably mounted on the vehicle so as to be able to turn the vehicle by operation of a handle 23 which is secured at the end of a steering rod 24 fixed to the housing 15.

Figure 3:
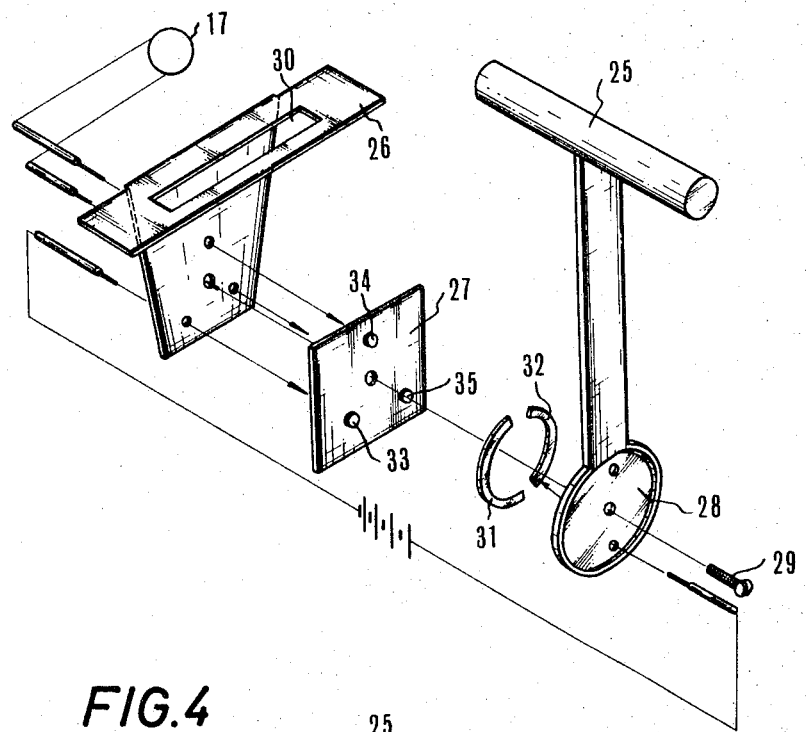
FIG. 3 is an exploded perspective view of the switch and associated batteries and the motor according to the present invention.

The vehicle according to the present invention is driven by operation of a lever 25 for switching on and off an electric circuit which connects the batteries 18 and the motor 17. As shown in FIG. 3, the switch used in the present invention may be a rotary switch. The rotary switch includes a frame 26 fixed to the body 10 of the vehicle, a terminal board 27, and a rotary disk 28 for switching the electric circuit on or off. The terminal board 27 is secured to the frame 26, and the rotary disk 28 is pivotably mounted on the terminal board 27 by a pin 29. The rotary disk 28 is formed as part of the T-shaped lever 25 having a flat arm portion which is extended vertically through an elongate horizontal slot 30 provided in the frame 26 with the lever bar 25 projecting above the body 10 to be easily operated by hand.

Figure 4:
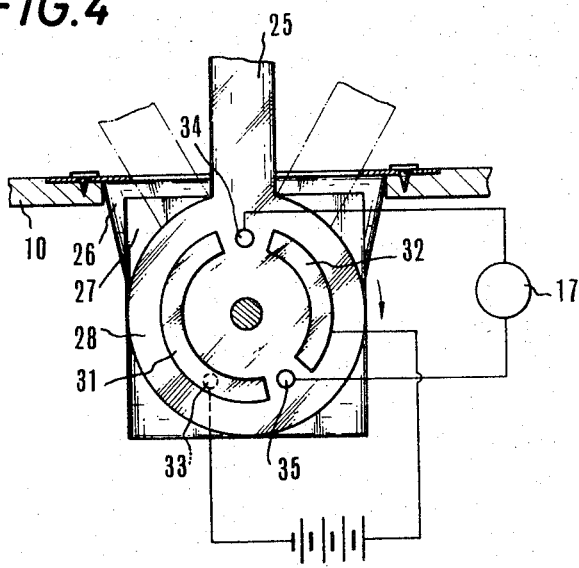
FIG. 4 is a side view of the switch illustrating the operation for connecting or disconnecting the electric circuit.

The rotary disk 28 is provided with semi-circular or arcuate-shaped electrodes 31 and 32 which are respectively connected to the cathode and anode of the battery. The terminal board 27 is provided with three terminals 33, 34 and 35, and the terminals 34 and 35 are connected to the motor 17, while the terminal 33 is frictionally contacted with the electrode 31 connected to the cathode of the battery, as shown in FIGS. 3 and 4.

The vehicle of the present invention may be driven by a person sitting on the seat 13 above the rear wheels 11 by swinging the upright lever 25 forwardly or rearwardly in the state of making or breaking the circuit. Thus, the rotary disk 28 associated with the lever 25 is rotated in a clockwise direction as viewed in FIG. 4 to bring the electrode 32 provided thereon into contact with the terminal 35, while the electrode 31 comes into contact with the terminal 34, and the motor 17 is thus energized. The drive shaft 14 on which the front wheel 12 is mounted is rotated by means of the gear reduction mechanism 16 when the motor 17 is energized, and the vehicle is driven in the forward direction. When the lever 25 is moved to its upright or neutral position, the electrodes 31 and 32 are disengaged from the terminals 34 and 35, and the electric circuit for connecting the batteries 18 and the motor is cut off, whereby the vehicle is stopped. In the same fashion, when the lever 25 is operated by swinging in the backward of counter-clockwise direction, the electrode 32 is brought into contact with the terminal 34, while the electrode 31 is brought into contact with the terminal 35, whereby the motor 17 is reversely driven to rotate the vehicle in the backward direction. Accordingly, in the present invention, a reversible motor is used to move the vehicle in both the forward and backward directions. However, the driving direction of the vehicle may be changed by rotating the handle through 360°.

According to the present invention, the body 10 is supported by the right and left rear wheels 11 and the front wheel 12, and the vehicle is driven by the front wheel 12 associated with the motor 17. Thus, the weight of a child driving the vehicle is mainly applied to the rear wheels 11. Consequently, the vehicle can be started with small torque even if the power source for actuating the vehicle is of low voltage. In the present invention, dry batteries can be used as the power source for the vehicle, so that the weight of the vehicle will be lightened and the vehicle will be easy for a child to handle.

Also, since the vehicle according to the present invention may be driven or stopped by manually operated lever 25 instead of the conventional pedal, even a child can easily recognize whether it is in the driving or neutral condition, or in the forward or reverse driving condition. In order to confirm the position of the manually operated lever more easily, the switch may be constructed in a manner that different forces may be required to transfer the electrical connections of the switch, so that the child may recognize the condition of the switch through the feeling experienced when he operates the lever.

Obviously, numerous additional modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A vehicle for a child comprising:

a vehicle body having a seat at the rear part thereof;

right and left rear wheels and a front wheel for movably supporting said body, said front wheel being disposed on a line substantially lying on the longitudinal center of the vehicle;

a handle for turning said front wheel in selected directions;

a gear reduction mechanism connected with said front wheel;

a motor for driving said gear reduction mechanism;

a battery power source; and means for connecting said power source to said motor comprising a manually operated lever for performing switching operations between said power source and said motor for controlling the operation of said vehicle, at least three terminals being arranged along a circular line on said vehicle body, with a first of said terminals being connected to one side of said motor and a second of said terminals being connected to the other side of said motor, a pair of arcuate electrodes disposed on an extended portion of said lever so that said electrodes lie in substantially the same circular line as said terminals, with one of said electrodes being connected to one side of said battery and the other of said electrodes being connected to the other side of said battery and in all positions of operation of said lever being in contact with a first of said terminals, and said terminals and said electrodes being arranged so that in a neutral position of said lever a second and third of said at least three terminals are not contacted by said electrodes, in a second position of said lever said one of said electrodes engages said second terminal while the other electrode engages said third terminal, and in a reverse position of said lever on the opposite side of said neutral position said one electrode engages said third terminal while said other electrode engages said second terminal, whereby said lever is operative to control the vehicle for respectively maintaining the same in a neutral driving condition, in a forward driving condition and in a reverse driving condition.

2. A vehicle for a child according to claim 1, further comprising accessory wheels disposed on both sides of said front wheel.

3. A vehicle for a child according to claim 2, wherein said accessory wheels are mounted on said vehicle so as not to be in contact with a surface of the ground or the floor.

4. A vehicle for a child according to claim 2, wherein said front wheel, said gear reduction mechanism, said power source, said motor and said accessory wheels are assembled as a unit to be mounted to a steering rod of said handle.

5. A vehicle for a child according to claim 1, wherein said motor is a reversible motor.

* * * * *